Nov. 29, 1966   R. S. JONES   3,288,235
CONTROL SYSTEM FOR GROUND EFFECT VEHICLES
Filed Nov. 1, 1963   4 Sheets-Sheet 1

Nov. 29, 1966    R. S. JONES    3,288,235
CONTROL SYSTEM FOR GROUND EFFECT VEHICLES
Filed Nov. 1, 1963    4 Sheets-Sheet 4

United States Patent Office 3,288,235
Patented Nov. 29, 1966

3,288,235
CONTROL SYSTEM FOR GROUND EFFECT VEHICLES
Richard Stanton Jones, Cowes, Isle of Wight, England, assignor to Westland Aircraft Limited, Somerset, England
Filed Nov. 1, 1963, Ser. No. 320,711
Claims priority, application Great Britain, Nov. 15, 1962, 43,165/62
20 Claims. (Cl. 180—7)

The present invention relates to ground effect vehicles, and more particularly to a control system for ground effect vehicles having flexible lift extensions.

It has already been established that the efficiency of ground effect vehicles is greatly increased by the use of flexible skirts, or trunks, which extend the walls of the main lift jets to a predetermined depth beneath the base platform. This increased efficiency is the result of a decrease in the "leak rate" from the pressurized ground effect cushion, thus conserving power and enabling a greater cushion height to be achieved in operation. The present invention is based on the discovery, that, when using such flexible skirts, local manipulation of the skirt by retraction or deflection at selected points around the periphery will produce a localized attenuation of the air cushion at that point, which attenuation causes the vehicle to roll and move towards the point of attenuation. Thus, a simple and effective directional control of the ground effect vehicle is realized.

The invention consists primarily in a means of maneuvering a ground effect vehicle, the maneuvering being effected by retracting or deflecting the flexible peripheral skirting around the base of the vehicle at one or more preselected points on the skirting. Local attenuation of the presurized air cushion enclosed by the skirting takes place, and the vehicle is induced to rall and to move towards the point of attenuation at a rate which is proportional to the degree of retraction or deflection.

An important object of the invention, therefore, is in the provision of a simple means for increasing the maneuverability of a ground effect vehicle.

A further object of the invention resides in the use of directional control means for ground effect vehicles having flexible skirt extensions.

Yet another object resides in the use of means for selectively retracting or deflecting flexible skirt extensions of lift jets already provided, thereby redirecting the flow of air and causing a redistribution or attenuation of the air cushion.

Further objects and advantages will become apparent during the course of the following description of the invention; the accompanying drawing forming a part thereof, and wherein:

FIGURE 3 is a plan view of a ground effect machine with the control system installed;

Figure 1:
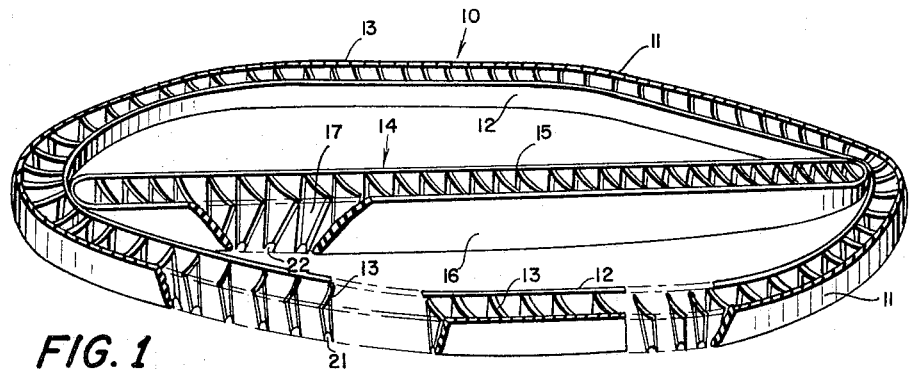
FIGURE 1 is a perspective view of a flexible skirt embodiment particularly useful for the present invention.

As shown in FIGURE 1, a particularly efficient ground effect vehicle includes extensions of the annular air jets in the form of flexible skirtings 10 of rubber, fabric, rubberized fabric, plastic or like material, the skirt being formed by an outer wall 11 and an inner wall 12, together with transverse strengthening and shaping diaphragms 13 to form separate flow-directing ducts or nozzles 21 within the skirting. In addition, there may also be provided at least one internally disposed flexible stability keel 14 formed of similar material, the stability keel also including formed jet nozzles 22 by outer walls 15 and 16 and internal shaping diaphragms 17. The stability keel partially segmentizes the air cushion flow and insures a highly efficient and stable machine.

Figure 2:
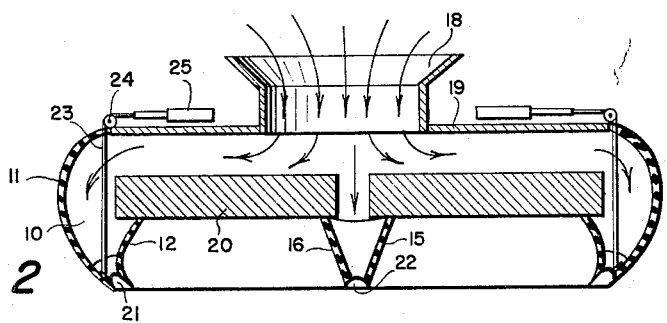
FIGURE 2 is a cross-sectional representation of a ground effect machine according to the invention.

Briefly, and with reference to FIGURE 2, a ground effect vehicle operates by drawing air into an intake 18 by suitable air pump means, which air is then pressurized and transferred via ducting to the jets defined by the flexible skirt 10 and the stability keel 14. The air is then expelled under pressure through the nozzles 21, 22, to provide the cushion of air beneath the vehicle and within the confines of the flexible skirt 10. Numeral 19 represents an elliptical deck for the vehicle, and 20 a centrally located buoyancy tank. As shown in FIGURE 3, a cabin 27 is provided for the vehicle, as is a propeller system 26 for providing forward directional motion.

In accordance with the present invention, the control means are provided to deflect at least the flexible skirt 10 at selected points thereof, thereby redefining and attenuating the air cushion to tilt the vehicle and move the vehicle in the direction of the tilting. Preferably, a number of symmetrically spaced points are selected, in order that more positive control can be obtained.

Figure 4:
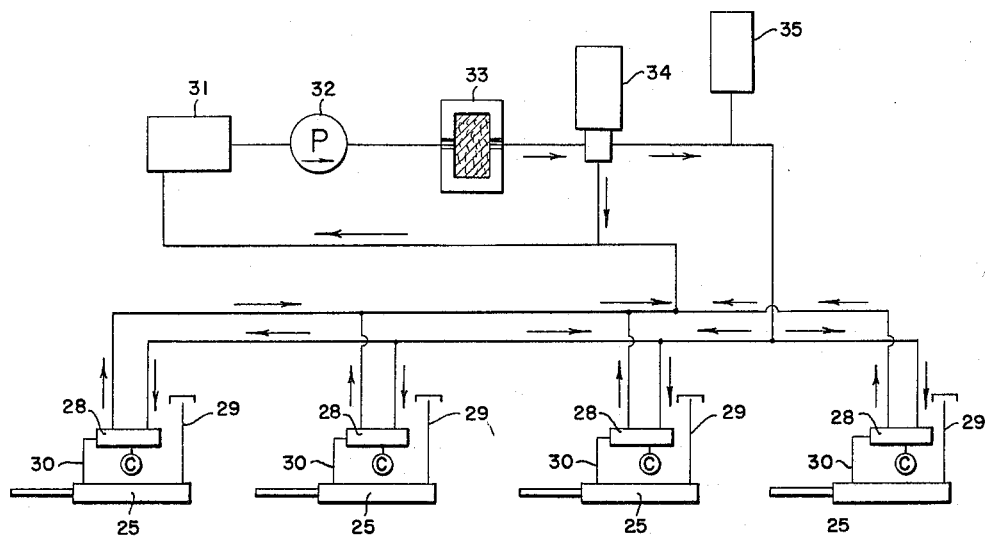
FIGURE 4 is a schematic representation of the embodiment of the control system of FIGURE 3.

In the embodiment shown in FIGURE 2, deflection is obtained by the use of flexible cables 23 attached at one end thereof to the outer wall 11 near the nozzle 21. The cable passes around a suitable deck-mounted pulley 24 and is attached at its other end to a hydraulic jack mechanism 25. Fluid operated controls are used to selectively manipulate each hydraulic jack 25, thereby selectively moving the cables 23 to deflect the flexible skirt. As shown in FIGURE 3, the lifting mechanisms are four in number and are symmetrically spaced, broad on bows and quarters of the vehicle. Each of the hydraulic jacks 25 is provided with a known type of electrically operated fluid servo-valve, for example, a Sperry Model No. 3050/2, and independent electrical controls C are used to control each servo-valve 28 in a known manner. Thus, independent operation at each point is obtained. Preferably, each of the controls for the servo-valves 28 can be joined to a common control wheel W, positioning of the wheel W generating co-ordinated signals to be sent to the respective servo-valves. Such control systems are well known in the art of controls. As shown, each hydraulic jack 25 is of a single-acting piston variety having a fluid inlet-outlet 30 at one end of the cylinder and a vent 29 at the other end thereof. A compression spring at the vent side of the piston can be used to aid returning the piston when no hydraulic pressure is applied. The system includes a hydraulic fluid tank 31, a fluid pump 32, a fluid filter 33, a known type of fluid flow cutout mechanism 34, and an overflow tank 35. The direction of fluid flow is shown by the arrows of FIGURE 4. As an example, the hydraulic fluid is continuously circulated by the pump 32. The cutout mechanism 34 permits fluid flow into the lines of each servo-valve 28 until a maximum pressure of 2300 p.s.i. is obtained. The cutout 34 then switches to the short circuit flow system until the working pressure at the servo-valves 28 falls to 1700 p.s.i., at which time the cutout 34 redirects flow of the hydraulic fluid to the servo-valves 28.

Figure 5:
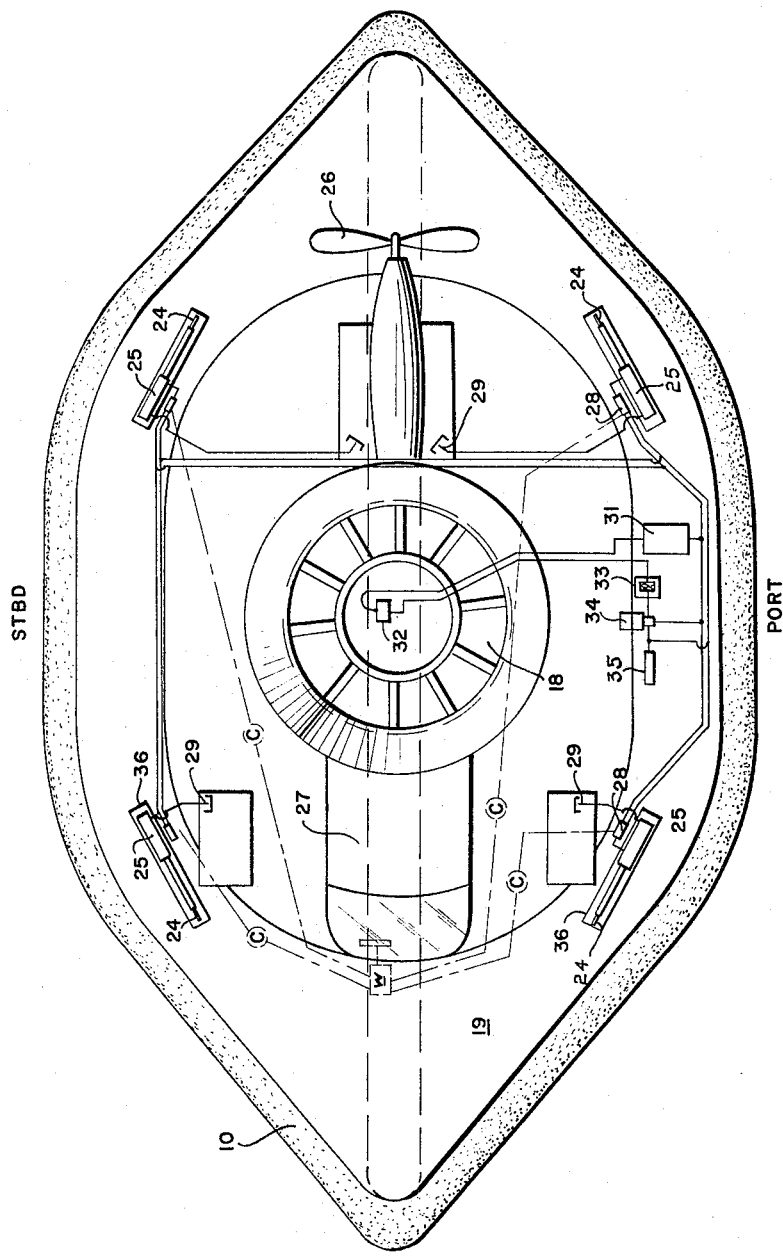
FIGURE 5 is a broken perspective view of the hydraulic jack mechanism for operating the control system.
Figure 6:
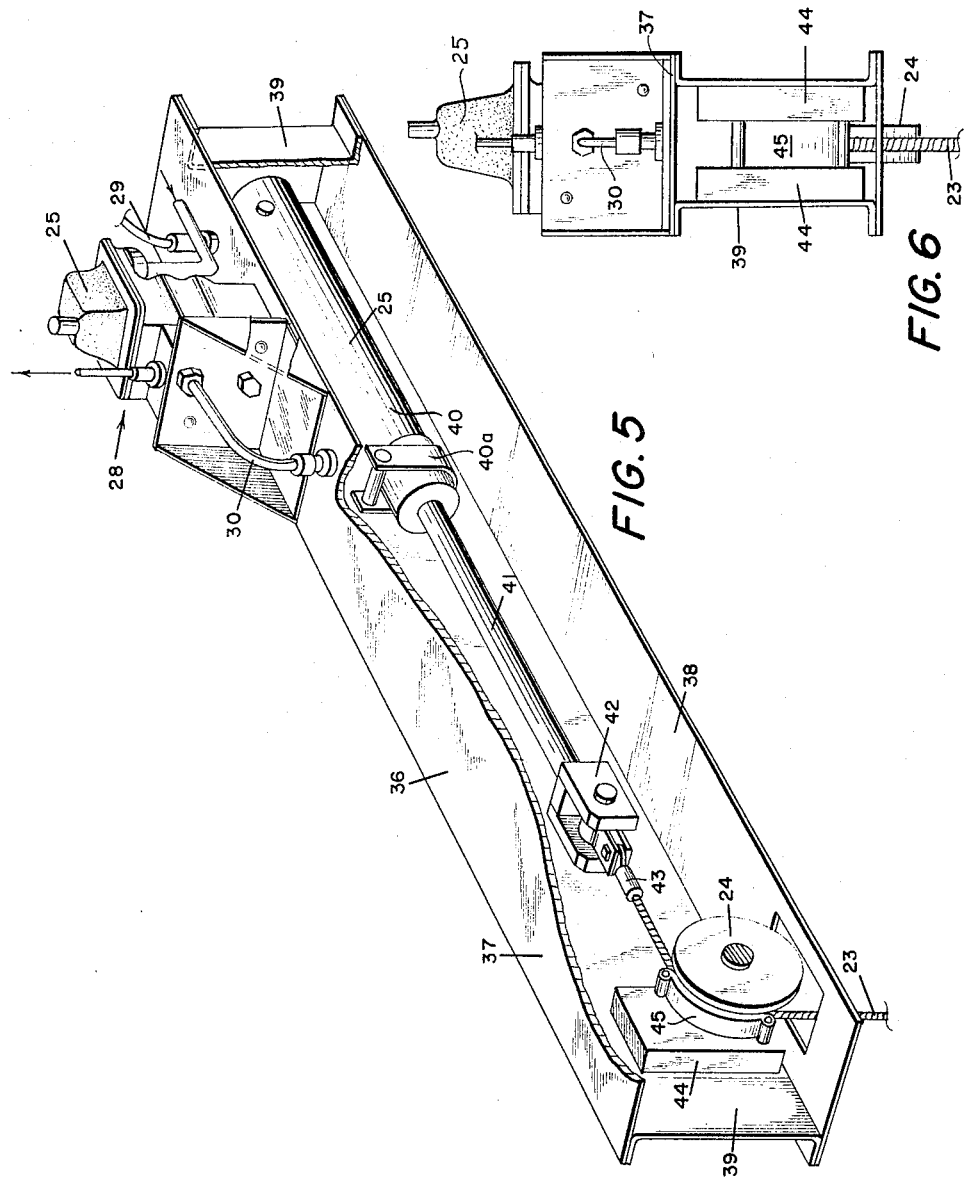
FIGURE 6 is an end view of the hydraulic jack mechanism.

Each independent hydraulic control system, as shown in FIGURES 5 and 6 includes the hydraulic jack 25, which is enclosed in a housing 36 having a top plate 37, a bottom plate 38, and side plates 39. The hydraulic jack, consisting of the cylinder 40 and the piston 41, is fixed to the housing 36 by at least one U-frame 40a. A stirrup is fixed at the piston end of the jack 25, and the cable 23 is attached to the stirrup 42 by means of a pivotable connection 43. The cable 23 passes around and through an opening in bottom plate 38. The pulley 24 is attached to a pair of blocks 44, which support a cable guide plate 45 therebetween. The servo-valve 28 is fixed to the top of the top plate 37, and the direction of hydraulic fluid flow to the valve 28 is shown by the arrows in FIGURE 5.

Figure 7:
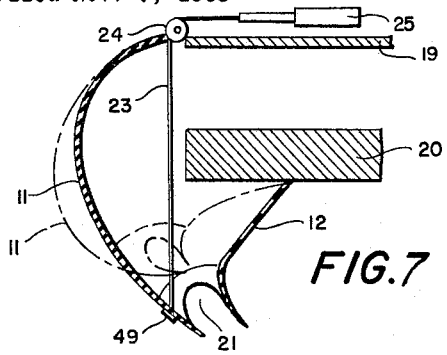
FIGURES 7–12 are schematic representations of various embodiments according to the invention.

FIGURES 7 through 12 show various embodiments for connecting of the lift mechanism to the flexible skirt. The preferred form, shown in FIGURE 7, shows cable 23 passing from above the deck plate 19, through the outer wall 11 of the flexible skirt 10 into the interior of the skirt and thence through the lower part of the outer wall 11 to be held thereto by a small plate 49. The dotted line discloses the shape of the skirt 10 when deflected, and, as can be seen, the nozzle 21 is partially closed and raised, thereby attenuating the air cushion at that location. Obviously, means are provided to prevent leakage of pressurized air at the points at which the cable passes through the walls of the skirting. However, an alternative arrangement can be provided, wherein the hydraulic jack mechanism 25a and the pulley 24a are positioned on the buoyancy tank 20 within the duct system. While access to the hydraulic jack mechanism 24a is not as readily available, minimum leakage is insured.

Figure 8:
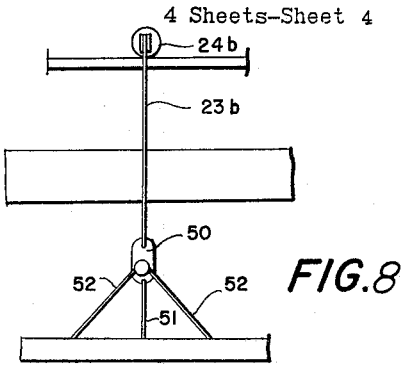

While the cable 23 may be attached to the outer walls 11 at single points thereof, FIGURE 8 discloses an arrangement for positive retraction of a short length of the skirting by using a "fan tail" wire. As shown, the main cable 23b is attached to the upper part of a pulley block 50, which is in turn attached to an end wire 51 fixed to the flexible skirting 10. Passing over the sheave of the pulley block 50 is a fan cable 52 attached at each of its ends to the flexible skirting wall 11. The fan cable 52 rides freely over the pulley block sheave, thereby enabling a positive deflection of the length of the skirt 10, even in cases of misalignment by stresses.

Figure 9:
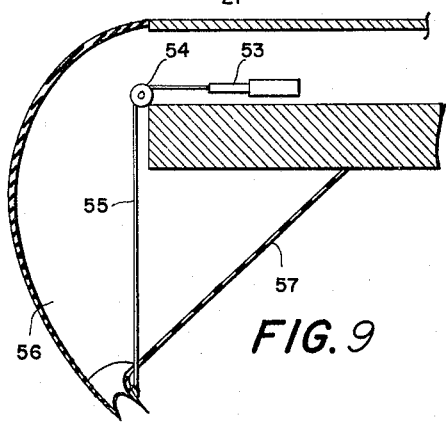

FIGURE 9 discloses an additional arrangement for connecting the cable to the flexible skirting. As shown here, the jack mechanism 53 and pulley block 54 are located on the buoyancy tank, but the cable 55 is attached to the inner wall 57 of the flexible skirting. In this arrangement, retraction does not close the nozzle as much as when the cable is attached to the outer wall, as shown in FIGURE 7, thus limiting the attenuation at that point. Alternatively, the jack mechanism 53a and pulley 54a can be positioned inboard, such that the cable 55a, attached to the outer wall 56, deflects the skirting inwardly to enable a greater closing of the nozzle than is available in the embodiment shown in FIGURE 7. Thus, a greater attenuation is effected.

Figure 10:
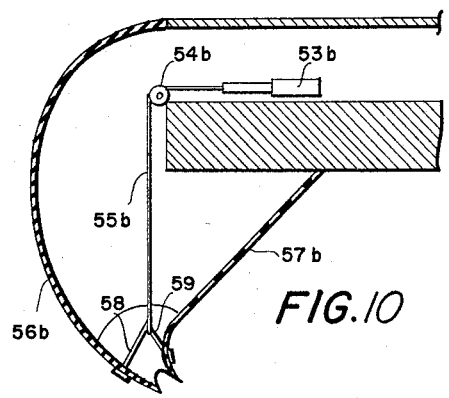

The embodiment shown in FIGURE 10 discloses the cable 55b to be attached by its ends to both the inner wall 56b and outer wall 57b of the flexible skirt. This arrangement provides for a more positive control of the nozzle at the point of deflection. The cable 58 may be replaced by a tie chain used to retain the shape of the nozzle during flight (see also FIGURE 12).

Figure 11:
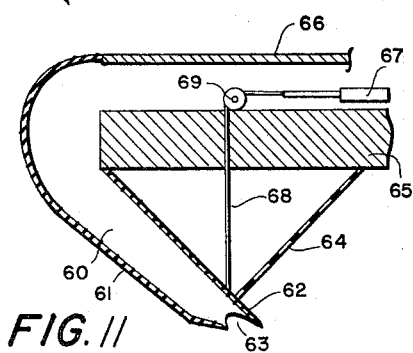

The arrangement shown in FIGURE 11 includes the buoyancy tank 65, the deck plate 66, and the modified flexible skirting 60 with inner wall 62, outer wall 61, ribs 64, and nozzle 63. The cable 68 is attached to the inner wall 62 at a rib end, and the hydraulic jack mechanism 67 and pulley 69 are positioned on the buoyancy tank 65.

Figure 12:
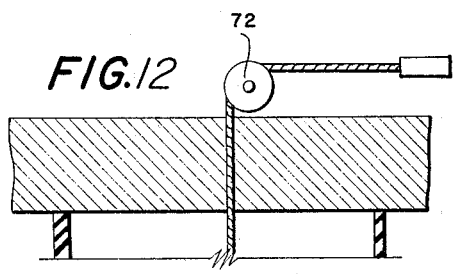

While the retraction mechanism is obviously suitable for control of the annular flexible skirting, it is equally usable for controlling the stability of the ground effect vehicle by deflecting the stability keel 17 shown in FIGURE 12, thereby modifying the "compartmentation" of the air cushion. In the arrangement shown, the cable 70 is attached to a tie chain 71 used to retain the shape of the nozzle. The tie chain is in turn attached at each end to the walls 15 and 16 by means of U bolts 72 fixed to the respective keel walls.

Figure 13:
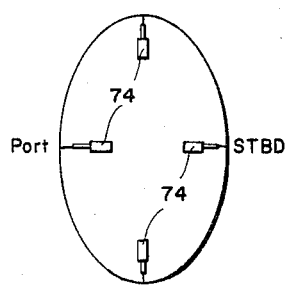
FIGURE 13 is a representation of an alternative form of selective location of the control mechanisms.

FIGURE 13 discloses the alternative arrangement of locating the selected control points 74 at the port and starboard beams, and at bow and stern. Obviously, more or less selected points can be used, depending on the size and desired maneuverability of the vehicle.

In operation, a pilot wishing to provide a control force or augment existing control forces will select an appropriate control to lift a portion of the skirting 10 clear of the surface over which the vehicle is travelling. Thus air is allowed to escape from the cushion through the created gap to attenuate the pressurized air cushion at that point, thereby causing the vehicle to roll. A g force will be generated to move the vehicle towards the point of attenuation. If the point of lift is on the starboard beam, the vehicle will roll to the starboard and side slip towards that point. Similarly, a lifting of the port skirt will slip to port in a manner like a parachutist making controlled descent. The amount of g generated will depend upon the size of the gap created in the skirt 10 and the rate of cushion attenuation. Thus, small amounts of "lift" and small gaps could be used to trim a vehicle being affected by cross winds. Further, a pilot can maneuver his vehicle in a static hover, this being particularly advantageous when navigating in confined spaces such as crowded ports, etc.

Other embodiments are of course within the skill of the art, and although the above discloses preferred embodiments according to the invention, various modifications can be resorted to without departing from the spirit of the invention or the scope of the subjoint claims.

I claim:

1. In a ground effect machine including a base platform structure, means defining a substantially continuous series of downwardly directed jet passages around the periphery of said platform structure, means for propelling the machine, and means for generating pressurized air to be discharged through said jet passages to provide a pressurized supporting air cushion under said platform structure for supporting the platform structure clear of the surface by its pressure, the improvement comprising a flexible skirt surrounding the platform and the jet passage means and extending below the lowest point of said platform to retard the escape of the air cushion which is bounded by the underside of the base platform structure, at least partially by the flexible skirt, and by the surface over which the machine operates, the flexible skirt extending around substantially the entire periphery of the base platform, and controlled deflecting means for mechanically deflecting the flexible skirt at selected points thereof to attenuate the air cushion at the selected points and induce a change in direction of the machine toward the selected point.

2. The improvement according to claim 1 wherein the skirt deflecting means comprises a cable attached to the lower end of the skirt at each selected point thereof, and control means to deflect the skirt by lifting said cable.

3. The improvement according to claim 1 wherein the means to deflect said skirt at selected points thereof are located at four points equispaced around the periphery of the said platform and skirt.

4. The improvement according to claim 2 wherein the cable is attached to the skirt by a pulley block attachment means comprising a pulley block fixed to the cable at the lower end thereof, a cable extension attached by one end to the pulley block at the other end thereof and fixed to the skirt by the other end, and a length of cable passing around the sheaf of the pulley block and attached at both ends thereof to the skirt on either side of the cable extension.

5. The improvement according to claim 1 wherein the skirt defines a plurality of air passage ducts forming extensions of the passage means, the ducts including nozzles for discharge of the pressurized air, and the deflecting means is fixed to redefine the passage ducts and nozzles at the selected points of deflection.

6. The improvement according to claim 5 wherein the deflecting means comprises a cable attached to the skirt near the nozzles thereof, and means to lift the cable and redefine the said ducts.

7. The improvement according to claim 6 wherein the lifting means comprises a hydraulic jack for each of the respective cables at the selected points, a servo-valve to individually control each of the hydraulic jacks, and fluid supply means to supply a hydraulic fluid under pressure to each servo-valve and hydraulic jack.

8. A maneuverable ground effect machine comprising a base platform, means including a flexible skirt extending below the platform to define an air cushion to support the platform, the flexible skirt including a pair of inner and outer generally vertically and downwardly extending walls and flexible cross diaphragms supporting the inner and outer walls in a spaced relationship, the cross diaphragms and walls forming a plurality of ducts and nozzles at the lower ends for the transfer of pressurized air to below the platform to form the said cushion and to act as an air curtain for retarding the escape of cushion air, and means to deflect the skirt at selected points thereof to redefine the flow of air and selectively attenuate the formed cushion to change the direction of movement of the vehicle.

9. The system according to claim 8 wherein the deflecting means comprises at least one cable at each selected point attached to a wall of the flexible skirt at a lower portion thereof, and control means to deflect the skirt by lifting the cable.

10. The system according to claim 9 wherein one end of the cable is attached to the outer wall of the skirt near the nozzles to partially close the nozzles at the respective selected point.

11. A system according to claim 9 wherein one end of the cable includes a pair of cable extensions, one being attached to the inner wall and the other one being attached to the outer wall of the skirt.

12. The system according to claim 8 and further comprising at least one flexible stability keel extending below the platform within the periphery of the skirt to stabilize the air cushion by partially compartmentizing the cushion, and further comprising additional means to deflect the flexible keel to further attenuate the compartmented cushion.

13. The system according to claim 12 wherein the keel is defined by a pair of spaced walls forming keel nozzles at the lower end thereof and includes means defining a passage of air between the said spaced walls to be discharged through the keel nozzles; and the additional deflecting means comprises at least one keel cable fixed to at least one selected point at the lower portion of the flexible keel, and means to deflect the keel by lifting the cable.

14. The system according to claim 13 and further comprising a flexible tie chain joining the spaced walls adjacent the keel nozzles thereof, the keel cable being attached by its lower end to the tie chain at a mid-point of the chain.

15. In a ground effect machine including a deck platform, a buoyancy tank below the platform, means for propelling the machine, and means intermediate the platform and tank to provide pressurized air to support the machine; a control system comprising, in combination; a flexible skirt surrounding and depending downwardly from the platform and tank and defining jet nozzles for delivery of the pressurized air to below the tank to define a symmetrical pressurized air cushion below the tank bounded by the tank, at least partially by the flexible skirt, and by the surface over which the machine operates, for supporting the machine by air cushion pressure; symmetrically spaced means to mechanically deflect the flexible skirt at selected points thereof to selectively attenuate the air cushion at the selected points and induce a change in direction of the machine toward the center of attenuation; individual hydraulic control means to independently operate each of the deflecting means at the points of deflection; and a hydraulic system to supply a hydraulic fluid under pressure to the hydraulic control means.

16. The system according to claim 15 wherein each deflecting means includes a cable attached to the skirt at a lower portion thereof; and the hydraulic control means includes a hydraulic jack mechanism mounted to raise the cable and thereby deflect the skirt and a servo valve to selectively supply the respective hydraulic jack mechanism with hydraulic fluid.

17. The combination according to claim 16 wherein the flexible skirt is defined by an inner and an outer wall, the outer wall extending from the base platform to below the buoyancy tank and the inner wall extending from the buoyancy tank, the inner and outer walls defining a plurality of annular jet nozzles for defining the air cushion, and the cable at each selective point being fixed to at least one of the walls adjacent the nozzles.

18. The system according to claim 17 and further comprising a centrally disposed flexible stability keel for partially compartmentizing the formed air cushion, and additional keel deflecting means for selectively deflecting the flexible keel to attenuate the compartmenting of the air cushion.

19. A ground effect machine comprising a base platform structure; flexible skirt means connected to and extending downwardly from said base platform structure around substantially the entire periphery thereof to define an air cushion space bounded by the underside of said base platform structure, at least partially by the flexible skirt means, and by the surface over which the machine operates; means for passing pressurized supporting air to said air cushion space to form a pressurized air supporting cushion for acting against the underside of the base platform structure so as to support the machine by air cushion pressure; means for propelling the machine in desired directions; and means for attenuating selected areas of said pressurized air supporting cushion so as to provide a measure of control for the machine, said last mentioned means comprising means for moving a selected portion of the skirt in a direction having an upward component.

20. A ground effect machine as set forth in claim 19 wherein said means for attenuating selected areas of said pressurized air supporting cushion comprises means for moving a selected portion of the skirt in a direction having an upward and a horizontal component.

References Cited by the Examiner
UNITED STATES PATENTS

| | | | |
|---|---|---|---|
| 1,104,542 | 7/1914 | Porter | 180—7 |
| 1,123,589 | 1/1915 | Porter | 180—7 |
| 3,172,494 | 3/1965 | Cockerell | 180—7 |

BENJAMIN HERSH, *Primary Examiner.*

M. SALES, *Assistant Examiner.*